Figure 1:
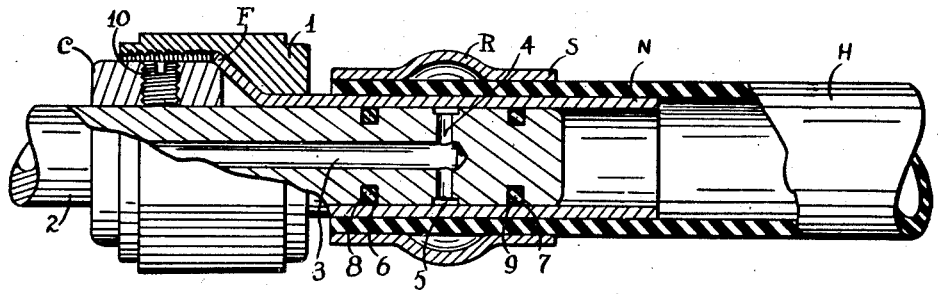

Aug. 23, 1949.　　　A. A. ROOD　　　2,479,702
COUPLING

Filed Aug. 22, 1945　　　　　　2 Sheets-Sheet 1

INVENTOR.
ALVIN A. ROOD
BY Richey & Watts
ATTORNEYS

Aug. 23, 1949.    A. A. ROOD    2,479,702
COUPLING

Filed Aug. 22, 1945    2 Sheets-Sheet 2

INVENTOR.
ALVIN A. ROOD
BY Richey & Watts
ATTORNEYS

Patented Aug. 23, 1949

2,479,702

UNITED STATES PATENT OFFICE 2,479,702

COUPLING

Alvin A. Rood, Cleveland, Ohio, assignor to The Weatherhead Company, Cleveland, Ohio, a corporation of Ohio Application August 22, 1945, Serial No. 611,961

5 Claims. (Cl. 285—84)

This invention relates to hose and tube couplings and to a method of joining or coupling tubular conduits, fittings and the like.

It is among the objects of my invention to provide a coupling for the end of a flexible tube or hose; to provide a mechanically strong and fluid tight connection between a hose end fitting and a flexible hose; to join conduits in a fluid tight relation; and to provide a method of joining conduits, fluid conductors and fittings in mechanically secure and fluid tight relation expeditiously and economically.

In attaching fittings to the ends of rubber or other flexible hoses two practices have predominated. In one the hose wall has been strongly squeezed radially between the sometimes roughened or threaded surface of an interiorly disposed nipple and an outer sleeve or shell, and in the other a nipple with a bulbous or other enlargement has first been forced into the end of the hose and thereafter the exterior of the hose has been contained, as by exterior nuts or clamps, from being withdrawn over the enlargement. Generally speaking the former has the advantage of the relative ease with which the nipple can be inserted into the hose, but has the inherent disadvantage of relying on mere compression of the hose wall rather than the bodily shape thereof for mechanical strength and fluid sealing. The latter, while having the advantage of utilizing the bodily shape and displacement of the hose wall to bring about an inherently strong self-sealing relationship has the concomitant disadvantage incident to inserting the bulbous or enlarged nipple into the hose with the attendant limitations inherent therein. The latter also presents difficulties in the form and disposition of the exterior clamping member and the manner of bringing about the desired coaction between it, the hose and the nipple. It is among the objects of my invention to augment the advantages of the prior practices and to eliminate the concomitant disadvantages and limitations whereby to provide better, cheaper and stronger joints and couplings along with an improved method of making the same.

While I shall refer to hose and flexible tube joints and couplings, my teaching, as will more fully appear below, also comprehends the joining of non-flexible tubes, fittings and conduits as such through the medium of a hose like part in the same or substantially the same way.

The general object of the present invention has been to provide a coupling of the type indicated and a method of making it, in which two tubular members are connected by interlocking an expanded portion on the inner member in a preformed recess in the outer member in a rigid, secure and tightly sealed manner. An additional object of the invention has been to provide a coupling in which the component elements are stressed and radially stretched substantially only in the regions which produce the most efficient bonding and sealing of the parts. Another object of the invention has been to provide a coupling in which the expanded portions may have desirably greater radii and greater sealing actions than has been heretofore practicable. A further object of the invention has been to provide a construction in which a minimum of difficulty is realized in assembling the members and shaping them together in tightly sealed relation. Still another object has been to provide a coupling that may be securely assembled rapidly to permit economical production.

Figure 2:
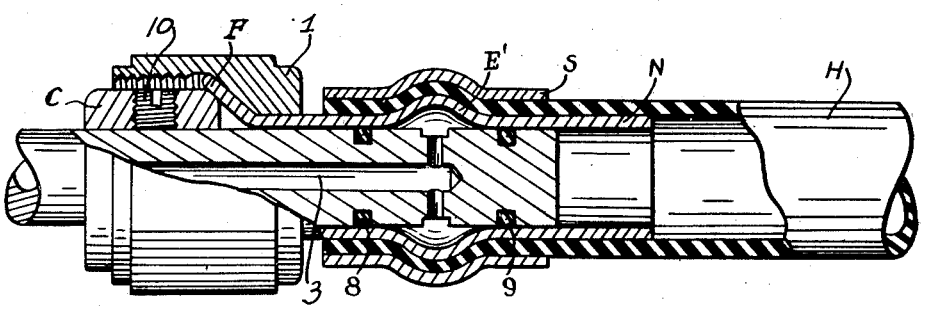
Figure 3:
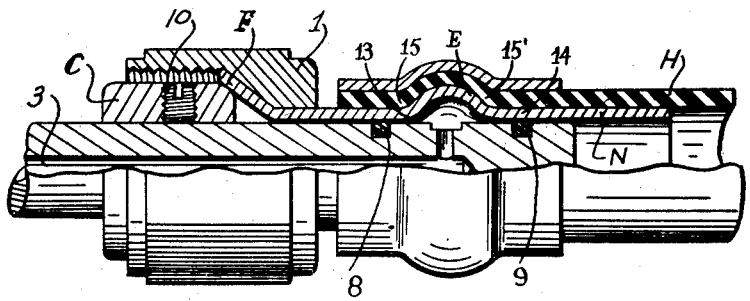
Figure 4:
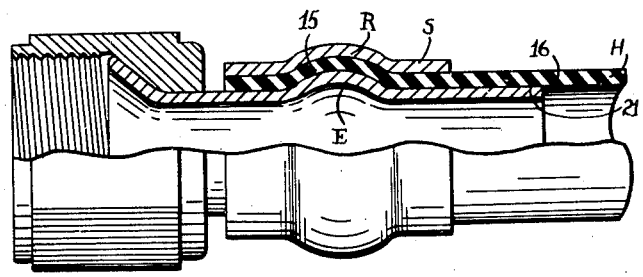
Figure 5:
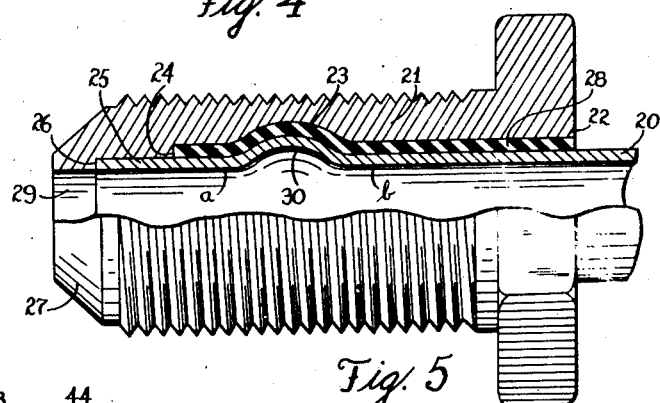
Figure 6:
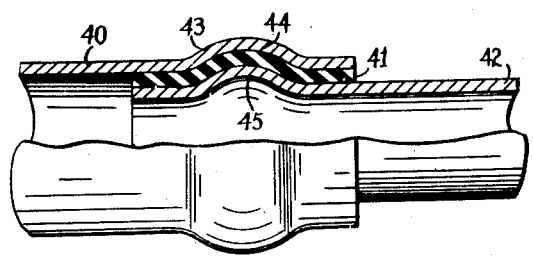
Figure 7:
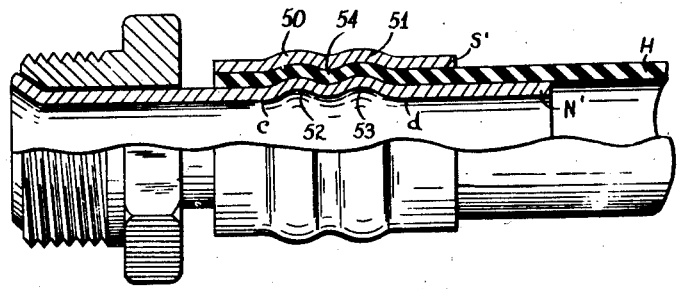

Other objects and advantages of the invention will become apparent from the following specification when read in the light of the accompanying drawings, in which Figure 1 is a partially broken longitudinal section of the parts to be coupled in a preliminary stage of assembly and positioned on an hydraulic expender; Figure 2 is a similar view of the same parts with hydraulic expanding pressure applied; Figure 3 is a view partially in section of like parts with hydraulic expanding pressure applied; Figure 4 is a view, partly in axial section and partly in elevation, of my improved coupling of the form shown in Figures 1 to 3; Figure 5 is a view, partly in axial section and partly in elevation, of a tube secured within a pipe fitting according to my invention; Figure 6 is a view, partly in axial section and partly in elevation, of a form of my invention joining two tubes; and, Figure 7 is a view, partly in axial section and partly in elevation, of a modified form of coupling shown in Figure 4.

In general, any of the couplings embodying the present invention will include an inner and an outer member, each of which is substantially rigid. The outer member may be of any external shape desired but provided with a substantially cylindrical bore in which there is preferably performed an internal annular recess as hereinafter described. Interposed between the inner and outer members is an intermediate tubular member preferably formed of a rubber-like relatively soft walled material more yielding than that of the other members and adapted to participate in the mechanical connection between the inner and outer members while providing a fluid seal therebetween.

In Figures 1 to 3 I have illustrated a preferred method of making the form of the coupling of my invention illustrated in its finished and preferred form in Figure 4. Referring to these figures by way of example of my method and one form of my coupling it will be seen that the invention here takes the form of a hose end fitting in which a hose H having rubber-like walls is contained within an outer metallic shell member S and in turn receives interiorly of the end of the hose a metallic insert or nipple N. As shown especially in Figure 4, when the coupling is completed the end of the hose is gripped between the shell S and the nipple N, and a portion of the wall of the hose adjacent the end thereof is stretched outwardly and is bodily enlarged to encompass an annular enlargement E of the nipple which is formed complementary to an annular recess R in the shell member S. In this form of the practice of my invention, while I have mentioned that the wall of the hose H is formed of rubber-like material, I contemplate not only the use of pure rubber or rubber-like hose but also of appropriately reenforced rubber or rubber-like hose in which the hose preferably has two characteristics; first, that the wall of the hose may be bodily stretched to an enlarged diameter, as shown in Figure 4, and that the wall section of the hose be of some softness whereby it may be compressed and gripped as between the shell and the nipple. Reenforcement of the structure of the wall of the hose is, within limits that will hereinafter become more fully apparent, of advantage in the practice of my invention so long as the reenforcement is not of such a character as to materially restrict the diametrical expansion of the hose whilst permitting the squeezing and compression of the body thereof. Fabric and even wire reenforced hose, the reenforcement of which may be stretched or deformed within the practice of my invention to take an unruptured form or substantially permanent set at an enlarged diameter readily adapts itself to the practice of my invention.

In this form of my invention I prefer that the outer or shell member S be of relatively strong metal or material such as brass or steel of such thickness as to withstand substantial internal expansive pressure without substantial yielding whereby to confine the hose and other elements when urged outwardly by radial expansion into the limited space into which they are intended to be expanded and confined. I also prefer that the shell S be internally cylindrical and have an annular enlarged internal recess R, as above mentioned, which preferably curves on a substantial radius in the longitudinal plane to reach an internal diameter exceeding the external diameter of the wall of the hose by substantially twice the thickness of the wall of the hose. The depth of the recess and the relation of the internal diameter of the recess to the external diameter of the hose and the internal diameter of the cylindrical part of the shell S will vary with the character of the hose wall and the relative hardness or softness thereof as well as with the internal structure of the reenforcement therefor; my teaching being that the depth of the recess should be adapted to the relative stiffness of the hose wall, the stiffer or more heavily reenforced walls requiring a lesser expansion than the more flexible walls to develop the desired mechanical strength and sealing effects.

The nipple N in this form of my invention is shown as containing in addition to its initial smooth cylindrical surface and configuration, shown in Figure 1, a flared end as at F which may coact with a conventional swivel nut wherewith to connect the leftward end of the nipple, as viewed in the drawings, to a conventional external instrumentality not shown. Preferably the nipple is a metallic tubular element of such wall thickness as is necessary to support the mechanical strain of the service to which it is to be put and the characteristic essential to the practice of my invention is that the material of the nipple, such as brass or steel or otherwise, be strong and at the same time ductile enough to permit the radial expansion thereof under the influence of internal and preferably hydraulic pressure to form the enlargement E without unduly straining the structure of the wall of the nipple and, of course, without rupture or failure while being enlarged as in, for example, the proportions shown in the drawings. Preferably the external diameter of the nipple while in its cylindrical form, as shown in Figure 1, is not substantially greater than the internal diameter of the hose H nor is it substantially greater than will permit the easy insertion of the nipple into the end of the hose. While I have shown the nipple N as extending into the hose to a greater length than the adjacent end of the shell member S, these relationships are well understood and it is not without the teaching of my invention to have the nipple longer or shorter than the shell and/or to have the shell flared or otherwise for the purposes of preserving the hose in the use to which it is intended to be put.

As shown in Figure 1 the end of the hose, the sleeve S and the nipple N are telescoped together as shown, the parts fitting one another in a manner whereby they are preferably assembled to that extent by modest manual exertion. With the parts so assembled it remains to expand the nipple, i. e., to form the enlargement E at the same time to form the enlargement in the corresponding portions of the hose. To this end I provide an hydraulic expanding element which comprises essentially the piston like member 2. So much of the member 2 as is illustrated in the drawings has a smooth cylindrical exterior freely but closely fitting the interior of the nipple N whereby to be readily inserted therein and removed therefrom. The member 2 has an internal bore 3 leading from the leftward end thereof, not shown, but connected or connectable with a source of hydraulic pressure. The bore 3 communicates with a cross-bore 4 leading preferably to an annular channel 5. Externally of the cylindrical wall of the piston 2 and preferably spaced longitudinally equidistantly from the channel 5 are formed annular channels 6 and 7 within which are contained piston rings or seals 8 and 9. The seals 8 and 9 may be of rubber or rubber-like material of the familiar O ring form and will contain between them the fluid under pressure admitted through the bore 3. Preferably that portion of the member 2, not disclosed in the drawings and lying to the leftward of Figures 1 to 3 may take any convenient form and may preferably be secured to a fixed object such as a bench so that the assembly of the hose nipple and sleeve as shown in Figure 1 may be readily slid over the piston to the position and in relation shown in Figures 1 to 3. Appropriate valves, fluid conduits and pumps will be provided whereby to admit fluid under pressure to the bore 3 and to bleed the high pressure therefrom under appropriate control of an operator as by pedals or other manual or automatic instrumentalities as may be convenient. To insure that the piston enter the nipple the desired distance I provide a collar C which may be adjustably secured to the exterior of the expanding member 2 in any desired position as by a set screw 10. The collar, as shown, will contact the flared end of the nipple F whereby to permit a predetermined length of the piston to enter the nipple and thereby center the seals 8 and 9 in the desired relation to the recess R of the sleeve S.

When fluid under pressure is admitted through the bore 3 of the piston 2 into the channel 5 and to the space between the seals 8 and 9 the radial force thereof forces the wall of the nipple outwardly whereby to form the annular enlargement E. When the finished position is reached the pressure required for further deformation would be almost double the pressure required for reaching the finished position. Consequently, the operator may readily control the pressure within the desired limits. If a high pressure source should be employed, an external relief valve in the pressure line may readily be set to unload the fitting before deformation of the shell S can take place. Preferably an automatic shut-off valve is provided to shut off the fluid pressure slightly above the pressure required for finishing the nipple N. Then, as soon as the pressure shuts off, the operator removes the assembly from the piston 2.

While I have mentioned using the well known O ring seals in the channels 6 and 7 I also find it preferable to use the type of seals disclosed in the Jackman Patent No. 2,349,170, and I contemplate that the use of various types of piston rings and piston seals will be advantageous in the practice of my invention.

In Figures 2 and 3 the enlargement E is shown to merge to tangency with the interior cylindrical surface of the nipple at about the points 13 and 14 and the curvature of the mid-portion of the enlargement E in the plane of the drawing is shown to be at a proportionately smaller radius than the curvature of the inside surface of the recess R of the shell S wherein the wall of the hose is compressed and reduced in thickness between about the points 15 and 15' whereby to be secured between the enlargement E and the recess R. After the wall of the nipple has been expanded and enlarged as shown in Figure 3, and the hose wall has been enlarged and secured therearound the fluid pressure within the piston 2 is released whereby to permit the ready withdrawal of the piston from the nipple and/or the withdrawal of the assembled coupling from the piston. The finished article is shown in Figure 4 wherein I have sought to illustrate that the end 13 of the nipple N may have been drawn toward the enlargement E in the course of the enlargement to show that the facility of the use of my invention contemplates the sliding of the walls of the nipple over the piston seals 8 and/or 9 during the enlargement of the portion E of the nipple.

As illustrated in the drawings above discussed, the curvature of the recess R merges smoothly into the interior cylindrical surface of the shell S as does the exterior surface of curvature of the enlargement E merge smoothly into the external surface of the cylindrical parts of the nipple. The smoothness or sharpness of this curvature of merger and the nature of the longitudinal curvature of the recess R and enlargement E may in the practice of my invention be adjusted to accommodate different qualities of hose or hose wall. My teaching is that the more flexible the wall of the hose the more desirable it is to have the curvature more sharp, i. e., have a lesser radius in the longitudinal plane for the recess and enlargement whereby to form a more sharply sinuous longitudinal curve in the wall of the hose in the finished coupling. Where the hose wall is reinforced I prefer that the curvature be smooth and less sharply sinuous whereby to avoid rupture of the reenforcing material whether wire or fabric or otherwise while still achieving the bodily enlargement of the hose for the purposes described.

In Figure 5 I have shown an adaptation of my invention to the connection of a conventional metallic tube 20 to and interiorly of a fitting 21 of exterior conventional form. Here by the practice of my invention I obtain a mechanically secure and a fluid tight joint between the tube 20 and the fitting 21. In this form of my invention the fitting 21 may have an interior bore 22 leading from the right or open end thereof inwardly to an inwardly cut or turned recess 23 which may have the general characteristics of the interior of the recess R above described. Preferably the bore 22 is continued beyond the recess 23 to a shoulder 24 wherein the bore is stepped down to a smaller diameter, as at 25 substantially equal to the exterior diameter of the tube 20 which in turn terminates in a shoulder 26 adjacent the leftward end of the fitting. Externally the fitting may take the conventional S. A. E. form with a flared tube seat as at 27 and appropriate external threads and wrench engaging portion as shown. Between the exterior surface of the tube 20 and the interior surface of the bore 22 and recess 23 of the fitting 21, I provide a rubber or rubber-like sleeve 28, the wall thickness of which may vary within reasonable limits within the teaching of the precepts of my invention. In the form shown I prefer that the sleeve 28 be not substantially thicker than the wall thickness of the tube 20. The assembly of the parts and the formation of the joint follows the teaching above described in connection with the hose end fitting. To accomplish this, the fitting 21 being formed interiorly as above described, receives the end of the tube 20 upon which has been sleeved the rubber-like intermediate member 28 both of which are in the straight cylindrical form when entering into the interior of the fitting 21. Thereafter an expander such as the hydraulic expander 2, above described, is entered into the assembly through the bore 29 of the leftward end of the fitting 21 with the sealing rings of the expander being disposed in relation to the interior surface of the tube 20 and the recess 23 substantially in the same way they are disposed with relation to the recess R in the hose end fitting above described. That is to say, my preference is that the piston seals of the piston corresponding to the expander 2 would be disposed at substantially the points $a$ and $b$ interiorly of the interior surface of the tube 20 whereby to confine the fluid pressure in the manner and for the purposes above described and to facilitate the expansion of that portion of the tube adjacent the recess 23 into the outwardly expanded rib or enlargement 30 of the tube 20. The rubber or rubber-like wall of the intermediate element 28 is gripped between the enlargement 30 and the recess 23 in the manner above described whereby to secure the parts mechanically as well as to form a fluid tight joint between the inner end of the tube and the interior surface of the fitting. In this way I provide not only a mechanical and fluid tight joint but I also obtain a cushioning and anti-vibration or vibration absorbent connection between the tube and fitting.

In Figure 6 I have illustrated a further embodiment and adaptation of the teachings of my invention. In that form the outer tube or conduit 40 contains at its end a configuration similar to the shell S discussed in connection with Figures 1 to 4. The end of the outer tube 40 has preformed within it the annular rib 43 which affords the annular internal recess 44 and is intended to be assembled with the inner tube 42 and the intermediate rubber-like sleeve 41. Following the precepts of my invention above described I contemplate that the inner tube 44 having been inserted in its cylindrical form into the intermediate sleeve 41 may be inserted into the end of the outer tube 40, telescoping within the recess 44 therein, and thereafter the inner tube may be expanded by such means as those disclosed above whereby to form the enlargement 45 longitudinally coincident with the recess 44 whereby to bind the two tubes together through the medium of the compressed annular sleeve 41. In this form I contemplate that the tubes 40 and 42 each be of metallic and ductile characteristics such as found in copper or light wall steel tubing and the like. In this form I also contemplate that the intermediate sleeve member 41 be of rubber-like material such as rubber, whether reenforced or otherwise. By the expansion of the inner tube 42 and the mechanical grip afforded between the enlargement 45 and the recess 44 the tubes 40 and 42 are mechanically secured together as are they also joined in a fluid tight joint in and through the office of the intermediate sleeve 41. In this form of my invention one or the other of the tubes 40 or 42 cannot practicably exceed in length the length of the expanding tool or instrumentality to be inserted thereinto for the purpose of bringing about the expansion of the enlargement 45. I contemplate however that it is practicable to use expanding members such as the hydraulic member 2, above described, whose length may readily be from a foot to a yard long without altering the teachings or principles of my invention.

In Figure 7 I have shown a modification particularly of the form of my invention heretofore illustrated and described in Figure 4. In the form of Figure 7 of my invention the hose H may be similar to that above described in connection with Figure 4 and the shell S' may be similar to the shell S except that I provide in this form two longitudinally adjacent annular ribs 50 and 51 with corresponding internal recesses preformed and adapted to receive the enlargements of the hose and nipple incident to the enlargement of the nipple in the annular enlargements 52 and 53. In this form of my invention I contemplate that the steps of the method of forming the coupling may be substantially the same as that above described and I prefer that when hydraulic pressure is applied interiorly of the nipple N' that the seals of the pistons be located substantially at about the points c and d interiorly of the nipple whereby to confine the fluid pressure between these points and expand the nipple and enlarge the surrounding hose wall to grip the hose within the recesses 50 and 51 of the shell S'. In so doing the hose will be compressed not only between the specifically enlarged portions of the nipple at the points 52 and 53 but also longitudinally between the enlargements 52 and 53 as at the point 54. In this form of my invention I am enabled to grip the hose wall in the double sinuous form as viewed in longitudinal section in Figure 7, and I believe that the double sinuous gripping form is of advantage in gripping thinner and less stretchable hose walls than with single enlargement of Figures 1 to 4.

While I have illustrated and described preferred forms of my invention in respect to the method and to the couplings or articles produced thereby and have disclosed a preferred mechanism for carrying out the method of my invention, I am aware that modifications, improvements and changes in the forms herein specifically illustrated and described will occur to those skilled in the art within the precepts and teachings hereof, and I do not care to be limited to the preferred or specifically disclosed forms of my invention or inventions or in any manner other than by the claims appended hereto.

I claim:

1. In a fluid joint, a rigid tube member for conducting fluid away from the joint, an external rigid member with a generally cylindrical inner surface in which is preformed an outwardly-extending torroidal recess having a smooth wall, said rigid tube member being inserted in said external member and extending across said recess and being substantially unstretched during positioning across said recess, and resilient rubber-like sealing means between said members, the portion of said tube member disposed across said recess being expanded toward said recess and conforming in curvature to the outline thereof to compress said resilient sealing means against the smooth wall of said recess and so retain said means and members together, the inner diameter of the cylindrical surface of said external member and the outer diameter of the expanded portion of said tube member being substantially equal whereby said resilient means resists axial separation of said members substantially by compression.

2. In a fluid joint, a rigid tube member for conducting fluid away from the joint, an external rigid member with a generally cylindrical inner surface in which is preformed an outwardly-extending torroidal recess having a smooth wall, the cross-sectional radius in an axial plane of said recess exceeding the radius of said cylindrical inner surface, said rigid tube member being inserted in said external member and extending across said recess and being substantially unstretched during positioning across said recess, and resilient rubber-like sealing means between said members, the portion of said tube member disposed across said recess being expanded into said recess and conforming in curvature to the outline thereof to compress said resilient sealing means against the smooth wall of said recess and so retain said means and members together, the inner diameter of the cylindrical surface of said external member and the outer diameter of the expanded portion of said tube member being substantially equal whereby said resilient means resists axial separation of said members substantially by compression.

3. A coupling comprising an external annular member with a generally cylindrical inner surface in which is preformed prior to assembly a smooth-walled recess of greater cross-sectional radius in an axial plane than the radius of said cylindrical inner surface, a coupling member having a tubular portion inserted in said external member and extending across said recess, rubber-like sealing means positioned between said external and second tubular members, said coupling portion extending across said recess being outwardly expanded toward said recess to compress said sealing means against the smooth wall of the recess in said external member and so retain all of said members together with a leak-proof seal.

4. The method of joining into a fluid tight coupling an outer and an inner cylindrical tubular element each formed from rigid material with an intermediate element formed of relatively soft material, which consists in preforming prior to assembly a relatively wide smooth-walled recess in the outer element of a depth substantially equal to the thickness of said intermediate element, assembling said inner, intermediate and outer elements in telescoped relation with a portion of said inner element extending across the recess in the outer element, forming fluid-tight seals across the aperture through said inner tubular element adjacent each side of said preformed recess, admitting fluid under high pressure within said tubular element and between said seals to expand the portion of said tubular and intermediate elements disposed across said recess forming a rib on said tubular element that compresses said intermediate element tightly against the smooth wall of said recess, the balance of said tubular element remaining unchanged in diameter.

5. The method of joining into a fluid-tight coupling an outer and an inner cylindrical tubular element each formed from rigid material with an intermediate element formed of relatively soft material, which consists in preforming prior to assembly a relatively wide smooth-walled recess in the outer element of a substantial depth, assembling said inner, intermediate and outer elements in telescoped relation with a portion of said inner element extending across the recess in the outer element, forming fluid-tight seals across the aperture through said inner tubular element adjacent each side of said preformed recess, admitting fluid under high pressure within said tubular element and between said seals to expand the portion of said tubular and intermediate elements disposed across said recess forming a rib on said tubular element that compresses said intermediate element tightly against the smooth wall of said recess, the balance of said tubular element remaining unchanged in diameter.

A. A. ROOD.

REFERENCES CITED

The following references are of record in the file of this patent:

UNITED STATES PATENTS

| Number | Name | Date |
|---|---|---|
| 605,195 | Bertwisle | June 7, 1898 |
| 1,013,046 | Murphy | Dec. 26, 1911 |
| 1,381,179 | Gerson | June 14, 1921 |
| 1,461,130 | Loughead | July 10, 1923 |
| 1,753,005 | Grady | Apr. 1, 1930 |
| 1,759,224 | Dick | May 20, 1930 |
| 1,915,041 | Wallace | June 20, 1933 |
| 2,093,092 | McElhany et al. | Sept. 14, 1937 |
| 2,094,147 | Forsberg | Sept. 28, 1937 |
| 2,381,426 | Allen et al. | Aug. 7, 1945 |

FOREIGN PATENTS

| Number | Country | Date |
|---|---|---|
| 276,247 | Great Britain | Aug. 25, 1927 |